United States Patent
Simpson

[11] Patent Number: 5,150,605
[45] Date of Patent: Sep. 29, 1992

[54] PACKAGE INTEGRITY DETECTION METHOD

[76] Inventor: Edwin K. Simpson, P.O. Box 266, Hurley, Mo. 65675

[21] Appl. No.: 663,541

[22] Filed: Mar. 4, 1991

Related U.S. Application Data

[63] Continuation-in-part of Ser. No. 444,530, Dec. 1, 1989, abandoned.

[51] Int. Cl.$^5$ .............................. G01M 3/26
[52] U.S. Cl. .......................... 73/49.3; 73/52
[58] Field of Search ................ 73/49.3, 52, 49.2, 40, 73/45.4

[56] References Cited

U.S. PATENT DOCUMENTS

| | | | |
|---|---|---|---|
| 4,503,712 | 3/1985 | Vigneaux | 73/861.89 |
| 4,593,554 | 2/1985 | Aarts | 73/49.3 |
| 4,660,408 | 5/1987 | Lewis | 73/28.06 |
| 4,686,856 | 8/1987 | Vavra et al. | 73/204.19 |
| 4,689,987 | 9/1987 | Aarts | 73/49.3 |
| 4,858,463 | 8/1989 | Rosse et al. | 73/49.3 |
| 5,029,464 | 7/1991 | Lehmann | 73/49.3 |

FOREIGN PATENT DOCUMENTS

| | | | |
|---|---|---|---|
| 58-34337 | 2/1983 | Japan | 73/49.3 |

*Primary Examiner*—Michael Razavi
*Assistant Examiner*—Raymond Y. Mah
*Attorney, Agent, or Firm*—Basil E. Demeur; Alan B. Samlan

[57] ABSTRACT

There is disclosed a method for determining the proper sealing of a hermetically sealed package. The method consists of the steps of providing a pressure source for effecting a movement of air mass, providing an enclosable vacuum chamber suitable for accommodating a hermetically sealed package therein being enclosable in sealing tight engagement. An air flow path is provided from the vacuum chamber to the pressure source, the air flow path having a valve interposed to isolate the vacuum chamber from the pressure source. The air flow path is provided with a mass flow transducer and a pressure differential measuring device. A hermetically sealed package is placed in the vacuum chamber and by activating the isolating valve to connect the vacuum chamber to the source of pressure, a flow of gas is effected through the air flow path activating the pressure differential measuring device to determine the rate of mass flow of gas through the mass flow transducer as a function of time. This data is then compared to a standard reference index which determines the integrity of the package seal.

8 Claims, 4 Drawing Sheets

TIME$_A$ = TIME$_B$ → NON-LEAKING PACKAGES

TIME$_C$ > TIME$_A$ → "C" IS LEAKING PACKAGE

OR TIME$_B$
(NO-LEAK)

Fig. 4

PACKAGE INTEGRITY DETECTION METHOD

CROSS-REFERENCE TO RELATED APPLICATION

This application is a continuation-in-part application based upon application Ser. No. 444,530, filed on Dec. 1, 1989, now abandoned, and entitled Package Integrity Detection Method, filed in the name of Edwin Simpson and which is presently co-pending.

BACKGROUND OF THE INVENTION

This invention relates to the testing of hermetically sealed packages to determine whether or not such packages have defects, such as air leaks and the like. More specifically, it pertains to an improved method and system for detecting leaks in such packages without affecting the physical integrity of the package incident to the testing procedure.

Various types of products are packaged in such a manner as to prevent the exchange of air from within the package with the air surrounding the package. Hence, such products as, bacon, wieners, luncheon meats and the like are vacuum packaged in flexible plastic packages. It is contemplated that a hermetically sealed package is sealed incident to a sealing procedure such that the package is sealed tightly enough to preclude the entrance into the package of ambient air and impurities. It is well-known that the free exchange of air through the packaging would allow contaminants to invade the product from without, or it would allow for the loss of product moisture, or in some cases the gain of outside moisture to the product. In each of such instances, the product quality or even product safety would be compromised. It is well-known that a product contained in a hermetically sealed package is known to retain its desired qualities for a longer period of time than if contained within a package which allows free exchange of air through its package boundaries. As indicated, the goal of hermetically sealing a package is to also prevent the intake of impurities from the ambient air which impurities could include bacteria which would have a deleterious effect on the food product packaged within.

Most products today are packaged in a production line at a fairly fast rate. The sealing portion of the packaging line must reliably secure each package within an airtight envelope. However, if there is a malfunction in the sealing equipment, there may be a large number of defective packages produced. The defective packages could represent a considerable economic loss to the company producing the product. A more serious problem occurs if defectively sealed products escape quality control checks, and a portion of the defective package products are boxed and shipped to customers. In such an event, the possible deleterious effects to the public are greatly enhanced.

Normally, in the past, defective packages were detected by visual inspection. However, only the larger and more obvious defects can be detected visually by quality control personnel. As production lines speeds have increased, visual inspection becomes a less effective method of detecting leaking packages.

Another method which randomly tests packages removed from a production line is illustrated in U.S. Pat. No. 3,117,441, entitled "Method and Apparatus for Determining Vacuum Conditions in Packaging." The obvious shortcoming of the device illustrated in U.S. Pat. No. 3,117,441, is that it only tests a random sampling of packages and cannot test each package as it passes through a conveyor system. Furthermore, the system as disclosed therein relies upon the concept of reducing the pressure within the test chamber to cause a distension of the package, and then slowly increasing the pressure back to reduce the distension of the package and measuring the rate of retraction of the package to a preselected retracted arrangement. It has been found that this system is subject to great error and will not always accurately detect leaking packages.

Another device used for detecting leaks is illustrated in U.S. Pat. No. 4,024,956, entitled "Method and Apparatus for Detecting Leaks." The method and apparatus as disclosed in this patent is useful in continuously testing for leaks in a series of fluid-type flexible packages which are conveyed along a conveyor path. This apparatus is more specifically designed, however, to be used with packages such as those containing potato chips and the like which have a certain amount of gas sealed within the container. The packages are compressed and the extent of their expansion when they are compressed is measured. Packages which have leaks will not expand in the direction required to measure a "good" package as opposed to one having a defective seal. However, this apparatus and method is not acceptable for use with rigid or semi-rigid packages such as those for cigarettes or bottles of pills where the degree of expansion of the package would be insufficient to make a determination of seal tight integrity.

Another device for determining the integrity of vacuum package is disclosed in U.S. Pat. No. 3,998,091, entitled "Test Apparatus for Determination Quality of Packaging for Vacuum Packaged Products." This device applies a stress on the package to determine the quality of the package by measuring the package deflection resulting from the stress. The device is not acceptable for use on a continuous conveyor line but can only be utilized for the random sampling of packages. Thus it has the obvious shortcoming of not being able to guarantee the quality of each and every package as it passes through the packaging conveyor system. Furthermore, as was indicated as a difficulty associated with the prior device mentioned above, the apparatus and method as disclosed in this patent similarly does not appear to function well for rigid or semi-rigid packages.

Another prior art approach operates on a traced gas principal, wherein sealed and enclosed packages are compressed or otherwise pressurized so that if leakage exists, it is ascertained through the monitoring of the leaking, traced gas. An obvious shortcoming to this method is that in order to properly test a package, a tracer gas must be introduced into the package in some manner. The only other method of conducting a test in this manner is to seal a randomly selected package with a radioactive or other tracer gas included therein, and to then determine whether or not the tracer gas or radioactive gas is detected in an enclosed chamber. This method has the drawback of requiring that random packages be preselected for testing by inserting a tagged or tracer gas therein during the packaging or sealing procedure, which will only be detected with respect to that package if it is a leaker. Such a testing method will basically only determine whether or not the sealing equipment is working properly, but will certainly not test a hermetically sealed package under normal circumstances.

A recent approach to detecting a leak in a package is illustrated in U.S. Pat. No. 4,858,463, entitled "Process and Apparatus for Detecting Leaks in Sealed Packages." The process and apparatus disclosed in this patent is based on the fact that the air leaking from a package into the sealed test chamber in which it is placed will increase the density of the air in the test chamber and as a result the pressure in the test chamber will increase. This increased test chamber pressure then would indicate a leaking package. However, a small change in the temperature of the air in the test chamber (a package temperature greater than the temperature of the air in the test chamber would result in an increasing chamber air temperature during tests) would also increase the air pressure thus erroneously indicating a leaking package. This sensitivity to temperature would greatly impair this device from accurately determining seal integrity of packages in actual practice.

Other apparatus and approaches have been used in detecting leaks and packages which are directed to arrangements which determine whether or not vacuum conditions in such packages have been lost. These techniques likewise, as with previously mentioned apparatus, are basically unsuitable for an accurate testing of a typical hermetically sealed package as it is constructed, filled, and sealed along a typical conveyor system. Furthermore, any testing procedure which will destroy the physical integrity of the package in order to conduct a test for leakage is not deemed to be a proper method of testing with respect to packages which are to be sealed in a normal course of events and which should be tested on a quality control basis. Accordingly, these types of apparatus and prior art methods fail to provide suitable arrangements which enable a rapid and continuous detecting of packages as they are continuously and successably advanced along a typical conveyor system.

OBJECTS AND ADVANTAGES

Accordingly, it is a principal object of the present invention to provide means for non-destructive testing of a rigid or semi-rigid package which is filled with a mixture of air and product, or contains a product under vacuum conditions within the package. The methodology of the present invention permits the determination of hermetic seal integrity and allows the procedure to be accomplished quickly and efficiently.

A further object of the present invention is to provide a method and system for testing the hermetic seal of a package by providing a vacuum chamber in which a test package may be positioned and enclosed in fluid tight engagement. An airflow path is established between the vacuum chamber and a pressure source for inducing a mass flow of gas. The airflow path is provided with valve means for isolating the vacuum chamber from the pressure source, and is further provided with a mass flow transducer and pressure differential measuring means which will indicate the mass flow rate through the air flow path. A hermetically sealed package may be placed in the vacuum chamber and the chamber closed in fluid tight sealing engagement. A mass flow of air is effected in the airflow path between the vacuum chamber and the pressure source by activating the valve in the airflow path. Simultaneously, the pressure differential measurement means is activated to determine the mass flow rate through the mass flow transducer as a function of time. A standard reference index of mass flow rate as a function of time for the system when testing a hermetically sealed package is provided and the measurements derived from a new test sample package are compared to the standard reference index to determine the seal integrity of the new test sample. If the mass flow rate as a function of time of the test sample does not compare favorably with the standard reference index provided, the quality control personnel will then be informed that a leaking package has been positioned in the vacuum chamber.

A further object of the present invention is to provide a system and method of the type disclosed, wherein the pressure source has a pressure value lower than the initial pressure of the vacuum chamber such that after the activation of the valve in the airflow path the direction of mass flow of air is from the vacuum chamber to the pressure source. The rate of mass flow through the mass flow transducer indicated by the pressure differential across the mass flow transducer measured by the pressure differential measurement means as a function of time represents the total amount of air that exited the vacuum chamber during the time of the test. If it is determined that the measurements taken during the test of a sample package show that the total air mass exiting the vacuum chamber is greater than that with a non-leaking package, as depicted in the data of the standard reference index, then it can be determined that the package in the vacuum chamber is a leaking package since during the test when air was exiting the vacuum chamber, air was also exiting the package into the vacuum chamber. This resulted in more air to be evacuated from the vacuum chamber in the case of a leaking package than a non-leaking package during the same test duration.

Further features and objects of the invention will thus be understood by reference to the accompanying drawings and the following specification which are intended to further amplify the invention.

SUMMARY OF THE INVENTION

Applicant's invention provides an improved method and system for testing hermetically sealed packages for leaks. The system is designed to either test packages at random, or on a continuous basis for packages manufactured in accordance with a conveyorized system. Applicant's invention consists of providing a vacuum chamber in which a hermetically sealed package may be positioned and enclosed therein in fluid tight engagement. An airflow path is established between the vacuum chamber and a pressure source for inducing a mass flow of gas. The airflow path is provided with valve means for isolating the vacuum chamber from the pressure source, and is further provided with a mass flow transducer and pressure differential measuring means which will indicate the mass flow rate through the air flow path. Time monitoring devices are also employed such that each and every test is conducted over a given period of time on an accurate basis. Once a supposed hermetically sealed package is placed in the vacuum chamber, the pressure source is activated by opening the isolating valve simultaneously with the pressure differential measuring device and the timing device. Furthermore, the system contemplates that a standard reference index of pressure differential change is provided such that packages which are properly hermetically sealed will effect a certain pressure differential change over a given period of time within certain precisely defined parameters. Once the system is activated, the pressure differential change is determined over a given period of time and then compared against the standard reference index. If the pressure differential change does not drop in accordance with the standard index when a vacuum condition is created in the vacuum chamber, one would then determine that the package contained within the vacuum chamber is a leaking package since it has contributed air or gas from within the package into the vacuum chamber which must also be evacuated from the vacuum chamber when a vacuum condition is created. Hence, the pressure differential change, which indicates the change in rate of mass flow of air through the air flow path, will not occur as rapidly and it will then be determined that a leaking package exists.

Alternatively, the method and system of the present invention may be designed to pressurize the vacuum chamber over a given period of time, and to measure the pressure differential change with respect to time and compare that to another standard reference index which is similarly geared for the amount of time it would take to elevate the pressure in the vacuum chamber over a give predetermined period of time. Once again, if a leaking package is contained within the vacuum chamber, it will take longer to pressurize the chamber since the package itself will accept pressurization and hence, the increase in pressure will take longer to accomplish within the given period of time. Such variation will then indicate to the quality control personnel that a leaking package is contained within the chamber.

BRIEF DESCRIPTION OF THE DRAWINGS

Foregoing any other objects of the invention, as well as further features and advantages thereof will be better understood by reference to the following drawings.

DETAILED DESCRIPTION OF INVENTION

The present invention derives from the theory that if a package to be tested is placed in a vacuum chamber and subjected to a vacuum by an external source such that the airflow exiting the test chamber was measured and totalized until a certain preset test pressure was achieved, then it could be determined whether the tested package has a leak within certain tolerances of precision. The theory is that the package is of a known volume and the test chamber has a known volume; and if the package has no leak then when drawing a vacuum or dropping the pressure from P1 and P2, a certain mass of air would exit from the volume which was the value of the test chamber minus that of the test package. The gas equation $PV = mrt$ can be used to calculate the change in mass of air in the chamber, that is, a certain amount of air will be drawn out of the chamber if there is no leak, but a greater amount if there is a leak in the package in a given period of time. Alternatively, it has also been determined that if a test were to be set up such that uniform packages were to be tested in a test chamber in which the difference in starting pressure and ending pressure were always the same, then all non-leaking packages should take the same amount of time to evacuate the air surrounding the package in the chamber and any leaking package would take longer.

Figure 1:
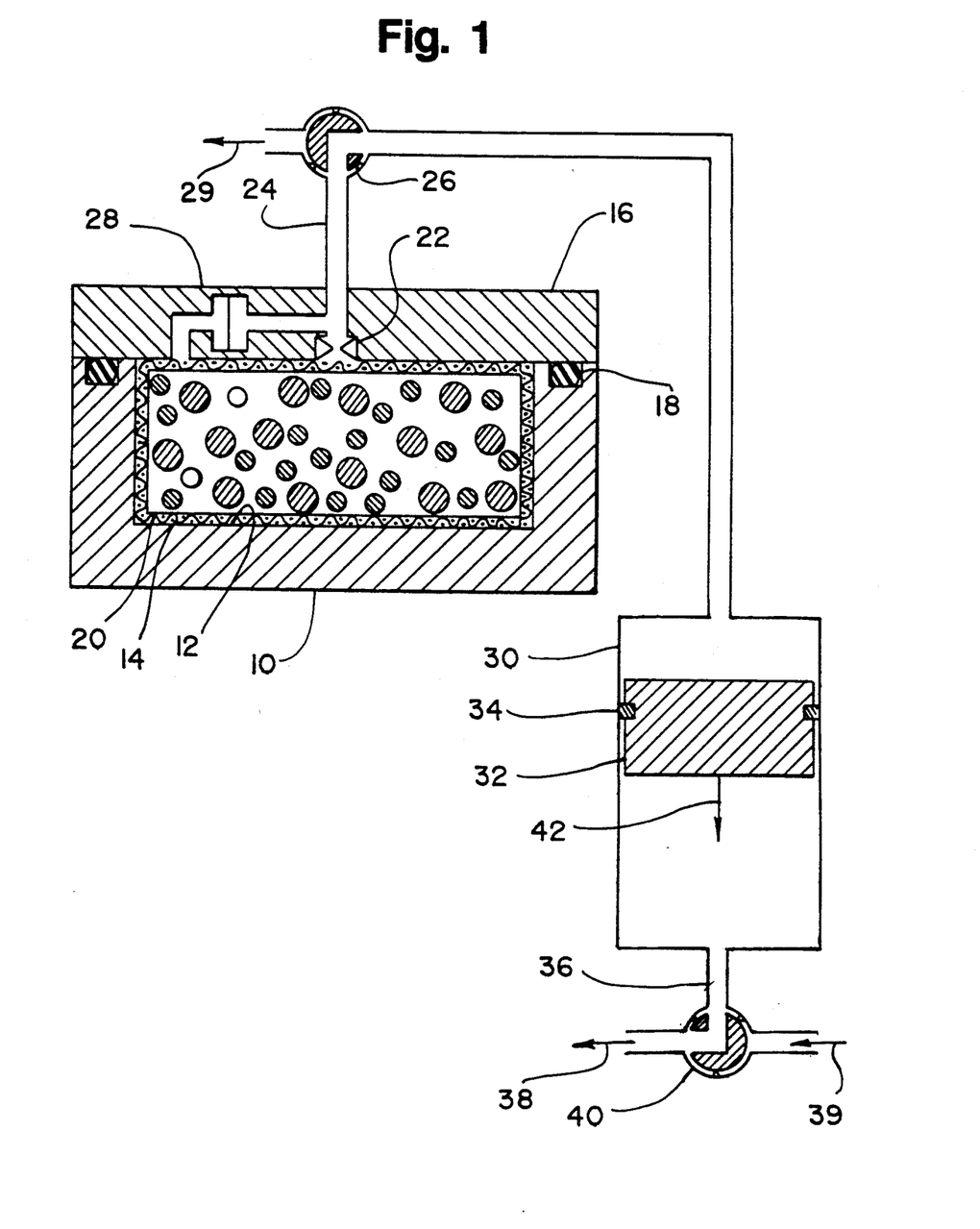
FIG. 1 is a plan view partly in cross-section, showing apparatus and system of the present invention which includes basically a vacuum chamber, a pressure source, and an airflow path connecting the two, the airflow path provided with a valve to isolate the vacuum chamber from the pressure source, and a mass flow transducer fitted with a pressure differential measuring device.

It has therefore been determined that in terms of an apparatus, FIG. 1 represents a schematic of an apparatus which operates in the manner intended by the present invention. As disclosed therein, the apparatus as a basic premise consists of a vacuum chamber 10 which accommodates a product cavity 12, the product cavity 12 being surrounded by a wire mesh 14. The vacuum chamber 10 is enclosed by means of a lid 16, which encloses the vacuum chamber 10 by means of a fluid tight sealing gasket 18. The product cavity 12 is designed to accommodate a test package product 20 which is positioned within the cavity 12, and within the confines of the wire mesh 14. The wire mesh 14 insures that the air surrounding the test package may be effectively evacuated during the test.

The chamber lid 16 is provided with a mass flow transducer 22 which in this case is an orifice of known diameter through which the moving air mass must pass to enter or escape the product cavity 12 into the airflow path 24. The airflow path 24 leads through an equalizing/isolation valve 26 which functions to equalize the product cavity 12 pressure with atmosphere through the exhaust port 29 while isolating the pressure source. Once activated, the equalizing/isolation valve 26 seals out the atmosphere while connecting the product cavity 12 with the pressure source, to be described hereinafter.

Also contained in the chamber lid 16 is a differential pressure measuring device 28 which functions to measure the pressure differential across the mass flow transducer 22 indicating the rate of mass flow of air through the airflow path 24.

The pressure source consists of a piston chamber 30 which accommodates a piston 32 which is in sealing engagement with the piston chamber 30 by means of a piston ring 34 in a manner commonly known in the art. In the preferred embodiment, the piston ring 34 is formed from a resin polymer which is of low friction coefficient material and which provides a leak path for air to pass from below the piston 32 to above the piston allowing the piston 32 to fall at a metered rate, not freely. The lower end of the piston chamber 30 is provided with exhaust/repressurization valve 40 which directs the escaping air from the lower portion of the piston chamber 30 through the exhaust port 38. Repositioning the exhaust/repressurization valve 40 allows air from the pressurized port 39 to move the piston 32 back up to piston chamber 30 after it has reached the bottom. It will be appreciated that as the piston 32 moves downward as generally indicated by the numeral 42, a vacuum condition is created in the piston chamber 30 above the piston 32, assuming the exhaust/repressurization valve 40 is open to atmosphere through the exhaust port 38. Hence, the piston arrangement as depicted in FIG. 1 represents one possible source of constant pressure to operate the present invention.

The differential pressure measuring device 28 may ideally also include time monitoring devices associated therewith such that upon commencement of a test procedure, time commences to be measured along with pressure differential change measured across the mass flow transducer 22.

From the standpoint of utilizing the present method and system for test purposes, and in connection with the use of the method and system by means of creating a vacuum condition, it will be appreciated that in operation a test product package 20 is deposited within the confines of the wire mesh 14 contained with the product cavity 12, and the enclosable lid 16 suitably positioned over the product cavity 12. The sealing gasket 18 insures that a fluid tight sealing engagement of the lid 16 relative to the chamber 10 is achieved. The test will start when the pressure source is opened by valve 26, evacuating air from the product cavity 12. Air contained within the chamber 10 is then evacuated through the mass flow transducer 22 and the pressure differential as measured across the mass flow transducer 22 by the pressure differential measuring device 28 is constantly monitored during the time span of the test.

In accordance with the present invention, a series of standard reference indexes have been developed utilizing hermetically sealed packages which are known to be leak free so that the change in pressure differential measured during any test of a sealed package for a particular period of time would be the same for any other leak free package. In other words, for any number of leakfree packages, all being the same size, each tested in the chamber where the starting pressures and test durations are the same and for which the provided pressure source was constant, the ending pressure differentials would be the same. This means that under the controlled conditions of equal starting pressures, constant pressure source, equivalent package dimensions and equal test durations the mass of air that passes through the mass flow transducer 22 will be the same for each leakfree packaged tested. However, if a leaking packaged is placed in the chamber and tested with the same starting pressure, constant pressure source, having the equivalent package dimensions and equal test duration as the leakfree packages, then clearly air or other gases from inside the leaking test package will also be drawn out into the test chamber and through the mass flow transducer 22 and the mass flow rate indicated by the pressure differential measuring device 28 will not have reached the same low value at the end of the test period as would have been reached during the test of a non-leaking package because more air is available to be removed during this same test period. The higher pressure differential measured at the end of the test of the leaking package is the indication used to determine a leaking package.

It is contemplated that the method and system of the present invention may just as easily be utilized with a pressurization concept, by simply making the pressure source have a pressure value higher than that of the initial pressure in the vacuum chamber 10, the mass flow of air will be from the pressure source into the vacuum chamber 10. In this instance, the mass flow transducer 22 would be measuring the flow of air into the vacuum chamber 10, upon pressurization, obviously air mass would be forced into the package placed within chamber 10, as well as into the chamber, so that more mass of air would need to be introduced into the chamber holding the leaking package in order to achieve the same pressure differential measurement across the mass flow transducer 22 as compared to that for a non-leaking package. In such instances, the measurement of the pressure differential, indicating the rate of mass flow, would not reach the same low value which would be expected during the same test duration of a leakfree package.

It will therefore be appreciated that the system and method of the present invention may operate equally well whether the evacuation method is utilized, or a pressurization technique is employed. The essence of the method and system of the present invention is the measurement of the mass flow of air into or out of the test chamber over a given period of time to determine the presence or absence of a leaking package.

It will further be appreciated that the method and system of the present invention may be adapted to high speed production lines such that individual packages coming down an assembly line may be separately tested during the production run of product. In such instances, it is contemplated that a plurality of vacuum chambers would be created as part of the production line or conveyor system, with each chamber having its own source of constant pressure, or indeed, a single source of constant pressure for a multiple number of chambers. Each package coming down the conveyorized production line would enter into a test chamber for the test to be conducted accordingly. In practice, it has been found that the test may be conducted over a period of less than one second using predetermined starting pressure differential and test duration. Ending pressure differentials which do not drop to a value predicted by the standard reference indexes would indicate the presence of a leaking package within the test chamber 10.

Figure 2:
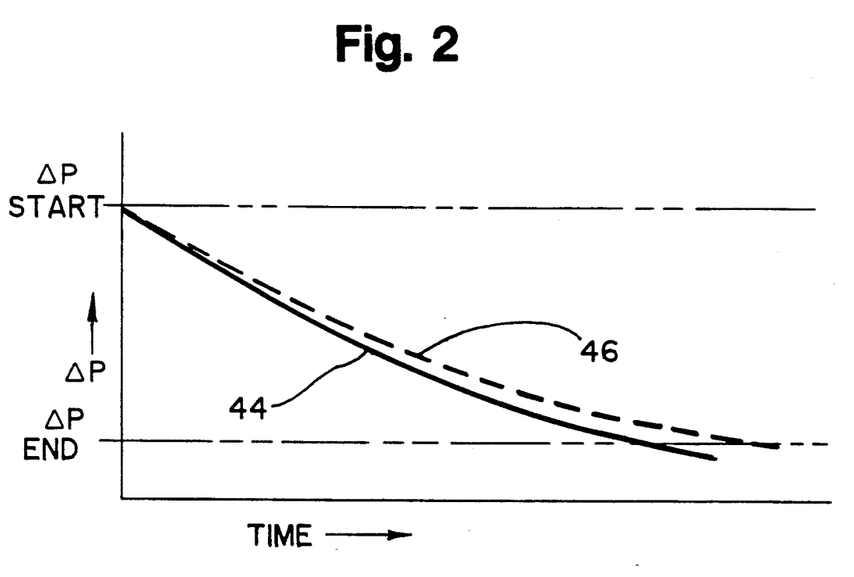
FIG. 2 is a graph including two curves showing the drop in pressure differential as graphed against time for a leaking package versus a non-leaking package where the starting pressure is the same for both packages.

FIG. 2 is a graph which illustrates the difference between a leaking package versus a non-leaking package wherein the same value of pressure differential measured across the mass flow transducer 22 is used to start the time measurement. For a non-leaking package, the pressure differential, indicating the rate of mass flow of air flowing through the transducer 22, versus time is represented by curve 44, and is shown to be substantially less than curve 46 which represents the pressure differential versus time for the leaking package. It will further be noted that a greater time is required to reach the same ending mass flow value of the leaking package than it did for the non-leaking package. This is obviously due to the fact that air from inside the leaking package must also exit the chamber, and therefore extra time is required. Also note that at any point in time, after the test start time, the value of pressure differential measured is greater for the leaking package than for the non-leaking package which reveals that a determination of a leaking package may be made in a very short period of time after the test starts.

Hence, assuming that a method is utilized wherein a constant pressure source is provided, the apparatus of FIG. 1 may be employed, and the presence of a leaking package can be determined simply by comparing the value of pressure differential measured across the mass flow transducer to the standard reference value at a certain point in time after the test begins. Hence, it will be appreciated that utilizing the equipment as depicted in FIG. 1, the test represented by the graph in FIG. 2 clearly presupposes that the starting pressure differential utilized for each test, that is, for leaking and/or non-leaking packages, is at the same starting value, and that the pressure source remains constant during the test and from test to test. In such an event, the graph of the drop in pressure differential versus time will appear as indicated, and the greater pressure differential at any particular time will clearly indicate a leaking package.

Figure 3:
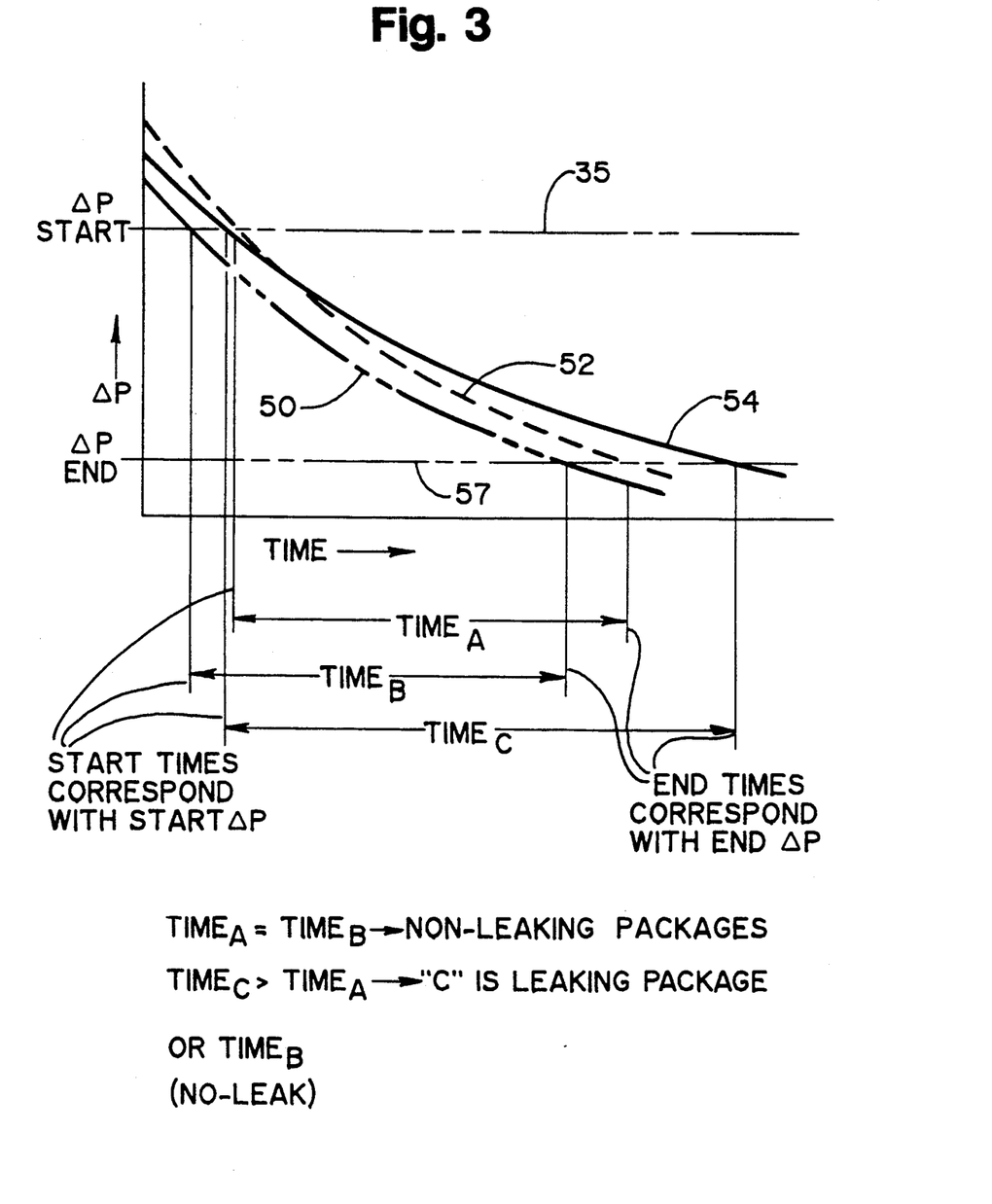
FIG. 3 is a graph including curves representing two test samples of no-leak packages, and the representation of a curve showing the results of a leaking package, the graph being graph of pressure differential versus time where the starting pressure for each sample was different but where the detection system will nevertheless permit detection.

In FIG. 3, there is depicted graphically, three different test packages wherein the change of pressure differential is related to the time of evacuation during the test cycle. It will be observed that in each of the three instances, the initial pressure differential is different, which can occur by changing atmospheric pressure, or a variety of other reasons. In such events where the starting pressure differential for each test might be somewhat different, the system is refined by providing equipment which will commence measuring the test time only when a certain pressure differential is achieved. FIG. 3 illustrates three curves, 50, 52, and 54 representing the tests of three different packages. It will be observed that while the starting pressure differentials were different for each of the tests, the start of time measurement began only at a common pressure differential value (represented by the numeral 55), such that the equipment will be designed to only commence measuring the time duration of the test when a certain pressure differential value is reached. In this manner, variations in atmospheric pressure, which may cause variations in starting pressure differentials, can be accommodated since the measurement of time will commence only when a certain value of pressure differential is reached. Once again, the method employed in arriving at the test results for the graphs depicted in FIG. 3 assumes that the pressure source is constant in value during the tests and from test to test, and that even though the starting pressure differentials may be different, time measuring does not commence until a given pressure differential value, measured across the mass flow transducer, is achieved.

It will also be observed that when one measures the time of evacuation from the initial starting pressure differential, to the end pressure differential point, 57 (FIG. 3) one can then compare the graphs to determine whether or not a leaking package has been discovered. It will be observed that with respect to FIG. 3, the time of evacuation for the package represented by curve 50 (time a) and the time of evacuation for the package represented by curve 52 (time b) are equal and would represent non-leaking packages. However, the time change between the starting pressure 55 and the end pressure 57 for the package represented by curve 54 (time c) is greater than time a, and therefore the package represented by curve 54 would be a leaking package. In other words, the time necessary for the pressure differential to drop from the starting value to the ending value was greater for this package than it was for either the package represented by curve 50 or 52, and hence a greater volume of air was evacuated from the chamber. The greater volume of air could only be the result of air or gas exiting from within the package positioned in the chamber. This test method similarly presumes that the pressure source is constant during the test and that each displaces an equal volume within the test chamber.

Figure 4:
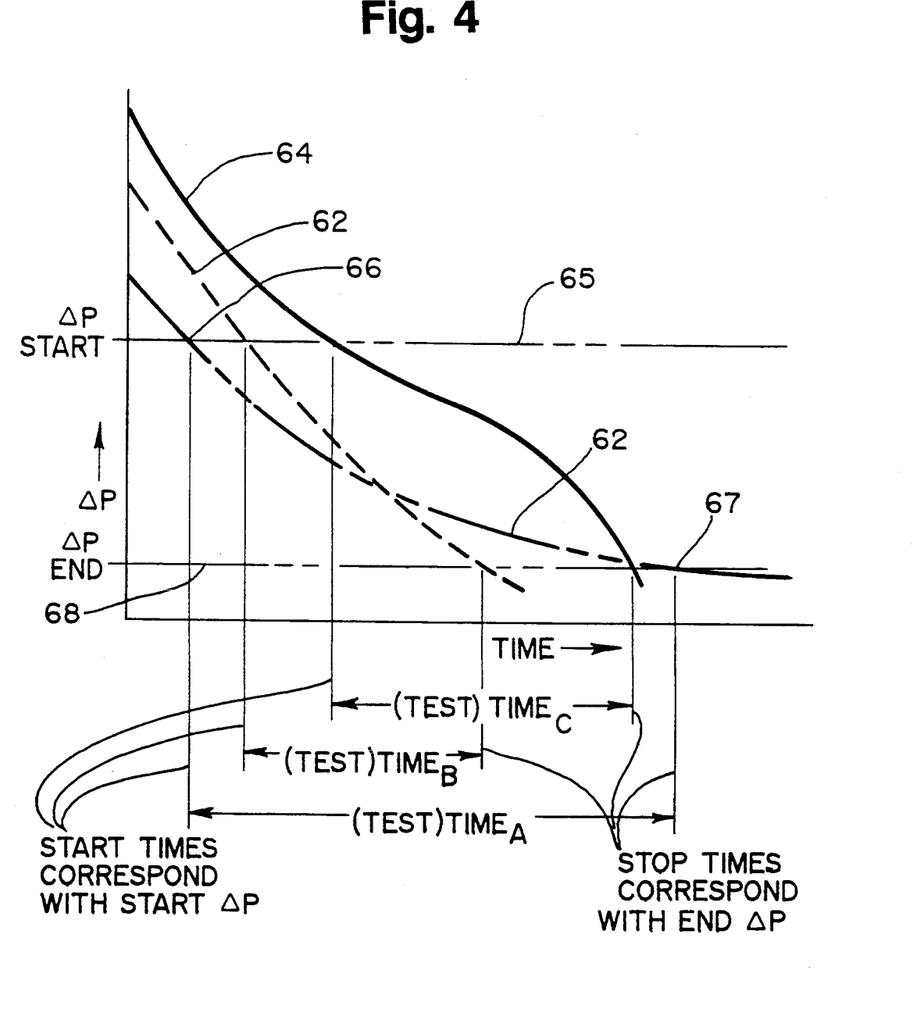
FIG. 4 is a graph showing curves for one leaking package and two non-leaking packages where the initial starting pressure is different for each package and the pressure source is not constant during each test, but where the detection system will nevertheless detect a leak.

FIG. 4 illustrates yet another variation of the test method which accommodates not only varying starting pressure differentials for each test, but can accommodate pressure variations in the pressure source. Hence, this figure shows a series of three tests conducted with packages wherein the initial pressure differential was different for each test, and the pressure source was non-constant during the conduct of the test. Hence, since the pressure source is not constant during the test, the pressure differential versus time relationship alone is not sufficient, but rather, by mathematically converting the pressure differential values into the actual mass flow rates, and integrating the mass flow rates over the time of the test duration, one can then compare the respective mathematical calculations to determine the presence of a leaking package. This conversion of pressure differential into actual mass flow rate is necessary when the mass flow transducer provides a non-linear pressure differential-to-mass flow rate relationship such as a sharp-edged orifice which is shown in FIG. 1. However, using a mass flow transducer which yields a linear output of pressure differential-to-mass flow rate, such as some laminar flow elements that exist, allows the direct integration of pressure differential versus time which results in a value directly proportional to the actual mass that has passed through the mass flow transducer. FIG. 4 presumes the use of such a transducer in order to simplify explanations. In this instance, the area under a curve of pressure differential versus time in FIG. 4 is directly proportional to the mass of air which exited the chamber during the test duration. With specific reference to the graphs shown in FIG. 4 are shown three curves, 60, 62, and 64 respectively, for three separate packages tested. It will also be observed that the monitoring equipment is provided with a variation such that it will not commence measuring test time passage until a given pressure differential value is arrived at, after which, time monitoring commences. This is represented by numeral 65 showing the pressure differential start value at which the test monitoring equipment will commence measuring time. Hence variations in initial starting pressure differential are accommodated by simply commencing the evacuation of the chamber and delaying time monitoring until a set starting pressure differential value is achieved.

It will be observed that with respect to curve 60, one can measure the change in pressure differential over the test duration (time a) from point 66 to point 67. In a comparison of the area under the curve 60 with a standard reference one would quickly determine whether or not a leaking package exists. In this instance, the integration of the area under the curve 60 would represent a non-leaking package. Curve 62 similarly shows the change in pressure differential measured across a mass flow transducer (being the linear output type here) against time from the initial set value for pressure differential to the set end value for pressure differential, and by integrating the area under the curve, this can be compared to curve 60. In this instance, curves 60 and 62 have equal areas under the curves and represent non-leaking packages. However, curve 64, as measured from the starting pressure differential value to the ending pressure differential value, defines a significantly greater area under the curve, and hence, represents more air mass movement from the test chamber. This clearly represents a leaking package, and can be quickly determined by reference to a standard index. Hence, once again, one measures the drop in pressure differential from the starting reference value represented by the numeral 55, to the ending pressure differential reference represented by the number 57. The comparison, in this instance, is between the areas under the curves since an integration function must be utilized in order to accommodate a non-constant pressure source.

The test method represented by FIG. 4 and the curves shown therein is considered to be a totalized flow method which allows for a varying pressure source instead of requiring a constant pressure source to yield accurate leak detection. Once again, changes in the starting pressure differential can occur due to variations in atmospheric pressure, or for other such reasons, and further, if the equipment employed cannot generate a constant pressure source, the method of the present invention may still be utilized by simply quantifying the change in pressure differential versus elapsed time of evacuation, integrating those measurements, and then comparing the mass of air that is evacuated from the test chamber to a standard reference.

Hence, the system and method of the present invention permits the operator to adjust the test methods to overcome any problems associated with the test. In other words, if the variations of atmospheric pressure and pressure source are deemed insignificant, the operator need only select a starting pressure differential pressure and an ending pressure differential value and measure the drop in pressure differential during the duration of the test and compare the ending pressure differential to that for a non-leaking package to determine the seal integrity of the test package.

Alternatively, the present method still permits accurate measurement and detection of leaking packages where the initial pressure differentials are not equal, so long as a starting pressure differential value is established which is below the lowest initial values to be experienced, from which the monitoring equipment commences to measure elapsed time. If the pressure source is not capable of producing a reliably constant pressure, the present method still permits comparisons to be made by mathematically manipulating the pressure differential change versus time data to arrive at a value which relates to the total mass of air transfer during the test.

It is also feasible to further add a temperature transducer to the equipment to further compensate so that the test end points will be based on repeatable starting and ending gas densities with only the test package volume variances affecting repeatability. In this manner, temperature differentials can similarly be accommodated and will not affect the outcome of the testing such that leaking packages will still be discovered.

It is also feasible to further add another pressure transducer to the system which would operate to negate inaccuracies which may be due to changes in the reference pressure. Such additional pieces of equipment and operational structures of the system will of course be apparent to one skilled in the art depending upon the sensitivity that is required by the system in order to test packages for leaks as may be desired.

Further from an operation standpoint, it is deemed desirable that the test device to be employed in the test should cater to the characteristics of the package to be tested, and to the desired sensitivity of the test as well as the length of test time. In other words the vacuum chamber dimensions may be tailored to particular packages being manufactured such that a reasonably close fit is realized. This would minimize the air volume evacuated or pressurized over a given period of time and therefore allows the operator of the test to basically shorten the test time. Furthermore, it has been found that a larger orifice size and a higher pressure differential pressure set point will give short test times, however smaller orifice sizes and lower pressure set points provide more sensitivity to smaller leaks. Therefore, these parameters may be optimized by the operator of the test in order to maximize the desired level of sensitivity for given packages to be tested. It is also quite apparent that the sensitivity of the measuring equipment is important to the test in order to be able to determine even fine leaks in packages, and therefore highly sensitive measuring equipment is deemed desirable for incorporation in the structural equipment to be employed.

Insofar as the equipment generally depicted in FIG. 1, it is believed that such technology is well within the scope of the known art and that the parameters of the system and method are strictly dependent on the level of sensitivity desired by the operator of the test. As indicated, the equipment as depicted in FIG. 1 is intended to provide a source of constant pressure for causing the evacuation of the test chamber, and further, the operator commences the test at the same starting pressure point. However, the equipment may similarly be utilized even if the starting pressures are different so long as a set monitoring pressure point is established for the equipment.

As indicated, the equipment may be varied accordingly such that the test method of the present invention may similarly be employed even if a source of constant pressure cannot be utilized.

As is apparent from the above description, the present invention provides an improved and sensitive test for determining the presence of hermetically sealed packages which may have leaks associated therewith, which can be tested for and determined on a random sample basis, or in connection with high speed production line processes. The present invention, in terms of a method and system, permit the operator to easily and efficiently determine the existence of a leaking package without physically abusing the package in any respect, by simply measuring the pressure differential changes which occur when a package is positioned in an isolated chamber and air is either evacuated therefrom, or pressurized therein, in order to determine the pressure change over time. The measurement of those changes and in comparison to a known standard reference index will clearly indicate the existence or presence of a leaking package as compared to reference points determined for non-leaking packages.

While there has been described what is at present considered to be the preferred embodiments of the invention, it will he understood that various modifications may be made therein and it is intended to cover in the appended claims all such modifications as fall within the true spirit and scope of the invention.

Claim:

1. A method for determining the integrity of a hermetically sealed package without affecting the physical integrity of the package, comprising the steps of,
   providing a pressure source for effecting a movement of air mass,
   providing an enclosable vacuum chamber suitable for accommodating a hermetically sealed package therein and being enclosable in sealing tight engagement,
   providing an airflow path from said vacuum chamber to said pressure source, said airflow path having valve means interposed therein to isolate said vacuum chamber from said pressure source, further providing said airflow path with mass flow measuring means for measuring the flow of gas mass between said vacuum chamber and said pressure source, placing a hermetically sealed package in said vacuum chamber and enclosing said vacuum chamber in fluid tight sealing engagement, effecting a mass flow of gas as between said vacuum chamber and said pressure source through said airflow path, activating said mass flow measuring means to measure the rate of mass flow through the said airflow path as between said vacuum chamber and said pressure source as a function of time, providing a standard reference index of mass flow as a function of time for said vacuum chamber when containing hermetically sealed packages thereon, and comparing said mass flow rate as a function of time against said standard reference index to determine the integrity of said sealed package as tested against said standard reference index.

2. The method for determining integrity of a hermetically sealed package as set forth in claim 1 above, wherein said pressure source comprises a source of constant vacuum pressure thereby to operationally evacuate said vacuum chamber when activated and effect a movement of air mass from said vacuum chamber through said airflow path to said pressure source.

3. The method for determining the integrity of a hermetically sealed package as set forth in claim 2 above, wherein said mass flow measuring means measures the mass flow of air exiting said vacuum chamber over a period of elapsed time, and comparing said mass flow measurement over time to said standard reference index to determine whether said hermetically sealed package has maintained its airtight integrity.

4. The method for determining integrity of a hermetically sealed package as set forth in claim 1 above, wherein said pressure source comprises a source of constant pressure whereby said vacuum chamber is operationally pressurized when said pressure source is activated and effects a movement of air mass from said pressure source through said airflow path to said vacuum chamber.

5. The method for determining the integrity of a hermetically sealed package as set forth in claim 4 above, wherein said mass flow measuring means measures the mass flow of air entering said vacuum chamber over a period of elapsed time, and comparing said mass flow measurement over time to said standard reference index to determine whether said hermetically sealed package has maintained its airtight integrity.

6. A method of determining the integrity of a hermetically sealed package as set forth in claim 1 above, wherein the initial starting pressure contained within said vacuum chamber is permitted to vary from test to test, and after said mass flow measuring means is activated, the measuring of elapsed time only commences when a certain predetermined mass flow rate has been achieved through said mass flow measuring means.

7. A method for determining the integrity of a hermetically sealed package without affecting the physical integrity of the package, comprising the steps of, providing a pressure source for effecting a movement of air mass, providing an enclosable vacuum chamber suitable for accommodating a hermetically sealed package therein and being enclosable in sealing tight engagement, providing an airflow path from said vacuum chamber to said pressure source, said airflow path having valve means interposed therein to isolate said vacuum chamber from said pressure source, further providing said airflow path with mass flow measuring means for measuring the flow of gas mass between said vacuum chamber and said pressure source, placing a hermetically sealed package in said vacuum chamber and enclosing said vacuum chamber in fluid tight sealing engagement, effecting a mass flow of gas as between said vacuum chamber and said pressure source through said airflow path, activating said mass flow measuring means to measure the rate of mass flow through the said airflow path as between said vacuum chamber and said pressure source as a function of time, manipulating the mass flow rate versus time data to arrive at a value relative to the total mass of air transferred through said mass flow measuring means during the elapsed time involved, providing a standard reference index of total mass transferred through said mass flow measuring means for said vacuum chamber when containing hermetically sealed packages therein, and comparing said total mass transferred against said standard reference index to determine the integrity of said sealed package as tested against said standard reference index.

8. A method of determining the integrity of a hermetically sealed package as set forth in claim 7 above, wherein the initial starting pressure contained within said vacuum chamber is permitted to vary from test to test, and after said mass flow measuring means is activated, the measuring of elapsed time only commences when a certain predetermined mass flow rate has been achieved through said mass flow measuring means.

* * * * *